United States Patent
Olsen

(10) Patent No.: US 8,675,264 B2
(45) Date of Patent: Mar. 18, 2014

(54) DOCUMENT CONVEYING DEVICE FOR USE IN A SCANNER OR THE LIKE

(75) Inventor: Bo Kjær Olsen, Hillerød (DK)

(73) Assignee: Contex A/S, Allerød (DK)

( * ) Notice: Subject to any disclaimer, the term of this patent is extended or adjusted under 35 U.S.C. 154(b) by 118 days.

(21) Appl. No.: 13/201,540

(22) PCT Filed: Feb. 19, 2009

(86) PCT No.: PCT/EP2009/051971
§ 371 (c)(1),
(2), (4) Date: Oct. 26, 2011

(87) PCT Pub. No.: WO2010/094333
PCT Pub. Date: Aug. 26, 2010

(65) Prior Publication Data
US 2012/0033271 A1   Feb. 9, 2012

(51) Int. Cl.
*H04N 1/04*   (2006.01)

(52) U.S. Cl.
USPC ............ 358/474; 358/497; 358/498; 358/483

(58) Field of Classification Search
USPC .................................. 358/474, 497, 498, 483
See application file for complete search history.

(56) References Cited

U.S. PATENT DOCUMENTS

| | | | |
|---|---|---|---|
| 4,592,543 A | 6/1986 | Tanimoto et al. | |
| 4,970,606 A | 11/1990 | Shima | |
| 5,927,706 A * | 7/1999 | Hiroi et al. | 271/117 |
| 6,091,927 A | 7/2000 | Hattori et al. | |
| 6,113,091 A | 9/2000 | Mizubata et al. | |
| 8,243,344 B2 * | 8/2012 | Bokelman et al. | 358/474 |
| 2004/0080092 A1 | 4/2004 | Chiang | |

FOREIGN PATENT DOCUMENTS

EP   1672905 A1   6/2006

OTHER PUBLICATIONS

International Search Report received for PCT Patent Application No. PCT/EP2009/051971, mailed on Jun. 21, 2010, 4 pages.
International Preliminary Report on Patentability received for PCT Patent Application No. PCT/EP2009/051971, mailed on Aug. 17, 2011, 12 pages.

* cited by examiner

*Primary Examiner* — Houshang Safaipour
(74) *Attorney, Agent, or Firm* — Morrison & Foerster LLP

(57) ABSTRACT

The document conveying device (2) for use in a scanner (1) or the like comprises a conveyor belt (3) arranged to convey a document (4) between an outer surface (5) of the conveyor belt and a flat surface (6). The conveyor belt (3) has an inner surface (9) supported by a first and a second roller (10, 11). Each of the first and second rollers (10, 11) is supported at three or more positions along its length in order to at least partially counteract forces from the conveyor belt (3) tending to deflect said roller.

24 Claims, 4 Drawing Sheets

DOCUMENT CONVEYING DEVICE FOR USE IN A SCANNER OR THE LIKE

CROSS REFERENCE TO RELATED APPLICATIONS

Figure 1:
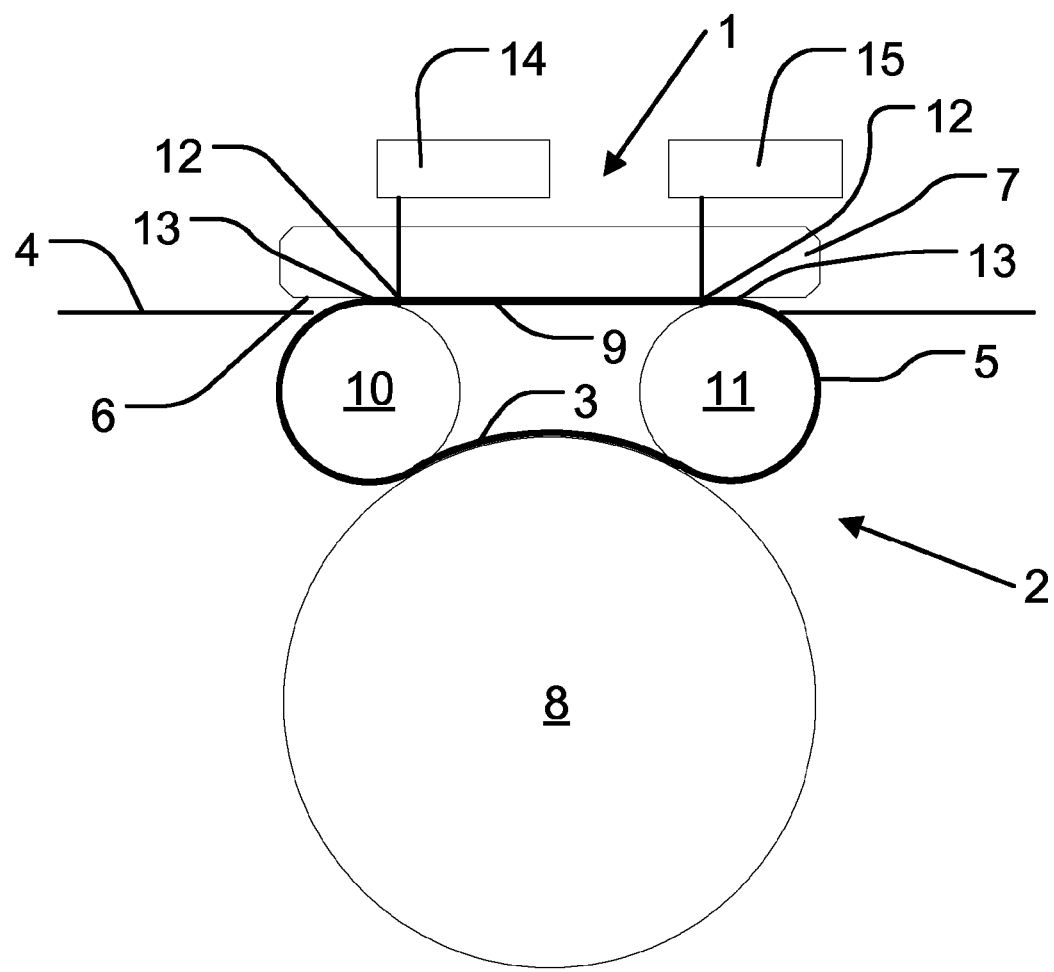

This is a U.S. National Phase patent application of PCT/EP2009/051971, filed Feb. 19, 2010, which is hereby incorporated by reference in the present disclosure in its entirety.

The present invention relates to a document conveying device for use in a scanner or the like, wherein a conveyor belt is arranged to convey a document between an outer surface of the conveyor belt and a flat surface, and wherein the conveyor belt has an inner surface supported by a first and a second roller.

U.S. Pat. No. 6,113,091 discloses an automatic document feeder for use with an image forming apparatus, such as a flatbed scanner, for conveying a document on a glass plate through which the document may be read by the image forming apparatus. A rotating conveyor belt presses the document against the glass plate thereby conveying the document along the plate. A number of pressing rollers presses the conveyor belt and thereby the document against the glass plate. In order to keep the tension of the conveyor belt constant, a tension roller is pressing against the outer surface of the conveyor belt. As the document is positioned stationary on the glass plate, an image is formed of the document by means of a scanning device mounted displaceably under the glass plate. However, this prior art document feeder is very long and consequently not suitable for a compact scanner in which the document is displaced across a stationary scan head during scanning. Furthermore, this document feeder is not able to advance the documents precisely as required for a scanner in which the document is displaced across a stationary scan head during scanning. U.S. Pat. No. 6,091,927 discloses another document feeder of the type in which a document is advanced by means of a conveyor belt to a flatbed scanner.

US 2004/0080092 A1 discloses a sheet feed image scanning apparatus in which a document is scanned though a scanning window as the document is progressively moved across the scanning window. As the document is conveyed across the scanning window, it is held against the circumference of a drum by means of two rollers pressing the document against the drum on either side of the scanning window. On the other side of the drum, the document may be held against the circumference of the drum by means of a conveyor belt running on two rollers.

EP 1 672 905 A1 discloses an image reading apparatus comprising a plurality of image sensors aligned in a zigzag shape and extending in a main scanning direction. The apparatus comprises a draft carrying unit adapted to carry a draft in a sub scanning direction during scanning of the draft. The draft carrying unit comprises draft carrying rollers arranged in a zigzag shape inverse to that of the image sensors, so that the draft carrying rollers are located in the areas between the image sensors. Thereby a compact image reading apparatus is obtained. However, due to the zigzag arrangement of the draft carrying rollers, narrow and/or thin drafts may not be gripped properly by the rollers, whereby the drafts may crumple. Furthermore, according to the document, complicated arrangements of the rollers are foreseen in order to allow thick drafts to path between the rollers.

Furthermore, a scanner in which the document is displaced across a stationary scan head during scanning is known, whereby a first and a second pair of rollers running against each other are arranged before and after the scan head, respectively, in order to convey the document. The scan head reads the document through a glass plate against which the document is pressed by means of a spring-biased plate or roller. However, as the conveying rollers are arranged before and after the scan head, this scanner has a certain minimum dimension in the conveying direction. Furthermore, the scanner may have to be specially adapted in order to convey thin or thick documents, respectively, due to the fact that the document is contacted at three different positions in the conveying direction.

The object of the present invention is to provide a compact device for precise conveyance of documents having different properties.

In view of this object, each of the first and second rollers is supported at three or more positions along its length in order to at least partially counteract forces from the conveyor belt tending to deflect said roller.

Thereby, a compact document conveying device may be provided by means of relatively thin first and second rollers placed next to each other, and due to the support of the rollers at three or more positions along their length, deflection of the rollers may be minimized, and the device may consequently be able to convey documents precisely during scanning. Due to the continuous contact between the conveyor belt and the document, both relatively thin and relatively thick documents may be handled without problems.

In an embodiment, the length of the first or the second roller is at least 15, and preferably at least 20 times greater than the diameter of said roller. Thereby, at very compact conveying device may be provided.

In an embodiment, the first and second rollers are supported by means of at least one support roller that is arranged so that it rolls against the first and second rollers. Thereby, the first and second rollers may be formed with a continuous supporting surface for the conveyor belt along their length. Thereby the conveyor belt may be more evenly supported, and therefore the document may be advanced more evenly, seen in its lateral direction.

In an embodiment, the at least one support roller is arranged in contact with the outer surface of the conveyor belt so that it rolls against the first and second rollers with the conveyor belt in between. Thereby, more space may be available for the at least one support roller, whereby greater flexibility in the design of the roller construction may be present.

In an embodiment, the at least one support roller has the form of one support roller having a larger diameter than the first and second rollers and having a length substantially corresponding to that of the first and the second roller. Thereby, the first and second rollers may be supported continuously along their length by means of a support roller having greater stiffness than the first and second rollers. The arrangement of one single support roller of larger diameter may be relatively simple compared to the arrangement of several smaller support rollers.

In a structurally advantageous embodiment, the diameter of the support roller is at least 3/2 times greater, and preferably at least 2 times greater, the diameter of the first or second roller.

In an embodiment, the at least one support roller is biased in the direction against the conveyor belt and thereby against the first and second rollers. Thereby, the pressure by which the conveyor belt presses the document against the flat surface may be adjusted by means of the biasing of the at least one support roller.

In an embodiment, the at least one support roller has the form of several support rollers that are arranged and supported separately along the length of the first and second rollers, and the several support rollers have a diameter that is smaller than the first and second rollers and are arranged inside the loop formed by the conveyor belt. Thereby, a very compact conveying device may be obtained.

In a structurally particularly advantageous embodiment, at several positions along the length of the first and second rollers, a support structure is arranged that carries four support rollers, two of which roll against the first roller and two of which roll against the second roller, and the support rollers are arranged symmetrically about a line connecting the axes of the first and second rollers, respectively.

In an embodiment, each of the first and second rollers is separated into a number of roller segments supported on a common shaft, and, by means of support structures, the common shafts are supported between neighboring roller segments. Thereby, a simple support of the first and second rollers may be obtained, whereby friction may be minimized.

In an embodiment, the conveyor belt is arranged to press the document against a glass plate through which the document may be read.

In an embodiment, the outer surface of the conveyor belt has a friction against paper that is larger than its friction against glass. Thereby, a paper document will be securely advance by the conveyor belt, whereas the glass plate will not be affected.

In an embodiment, the conveyor belt is provided with a number of holes spaced in the longitudinal direction of the conveyor belt, and a sensor, such as an infrared sensor, is arranged at the inner surface of the conveyor belt and is adapted to detect, through the holes of the conveyor belt, an edge of a document conveyed by the conveyor belt. Thereby, the position of the document in the conveying device may be surveyed regardless of the color and material of the document.

In an embodiment, the conveyor belt comprises a first and a second conveyor belt provided side by side and spaced so that a gap is provided between the first and the second conveyor belts, and a sensor, such as an infrared sensor, is arranged at the inner surface of the first and second conveyor belts and is adapted to detect, through the gap between the first and second conveyor belts, an edge of a document conveyed by the conveyor belt. Thereby, the position of the document in the conveying device may be surveyed regardless of the color and material of the document.

The present invention further relates to a scanner comprising a document conveying device as described above. The scanner is characterized in that the conveying device is adapted to advance the document to be scanned during scanning.

In an embodiment, an image scanning device is arranged to scan the document in a scanning area that is displaced slightly away from the tangential contact point of the first or second roller in which tangential contact point said roller contacts the flat surface with the conveyor belt and the document in between. Thereby, it may be avoided that the scanning is affected by wear of the glass that may occur at said contact point due to the fact that dust and other particles may rub against the glass surface where the contact pressure is large.

In an embodiment, a number of first image scanning devices are arranged at the first roller, a number of second image scanning devices are arranged at the second roller, each image scanning device has the form of a CIS (Contact Image Sensor), and the first image scanning devices and the second image scanning devices are arranged staggered in relation to each other.

In an embodiment, a number of image scanning devices are arranged at the first roller, at the second roller, the conveyor belt is arranged to convey the document between the outer surface of the conveyor belt and a third roller, each image scanning device has the form of a camera, such as a CCD sensor focusing by means of lenses, and the image scanning devices are arranged side by side with a slightly overlapping focusing area.

Figure 2:
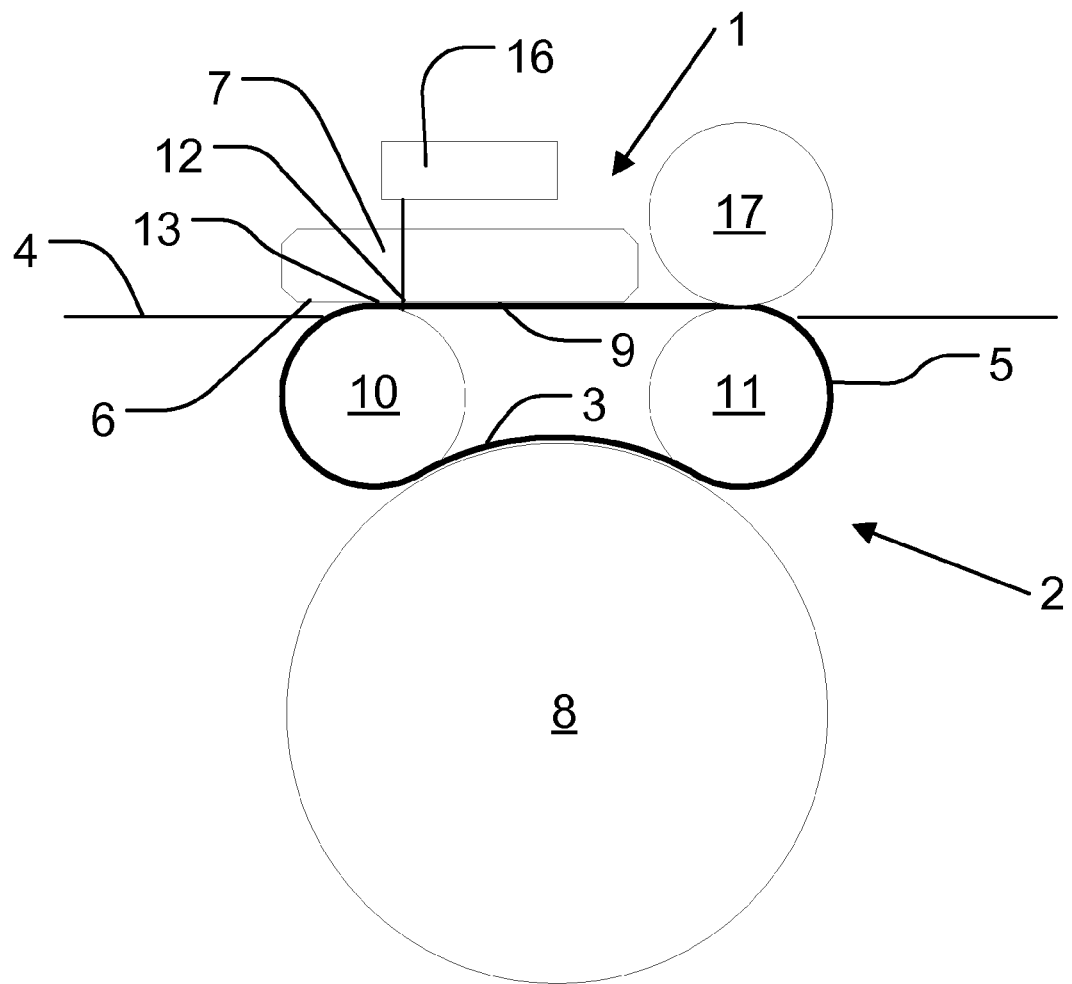
Figure 3:
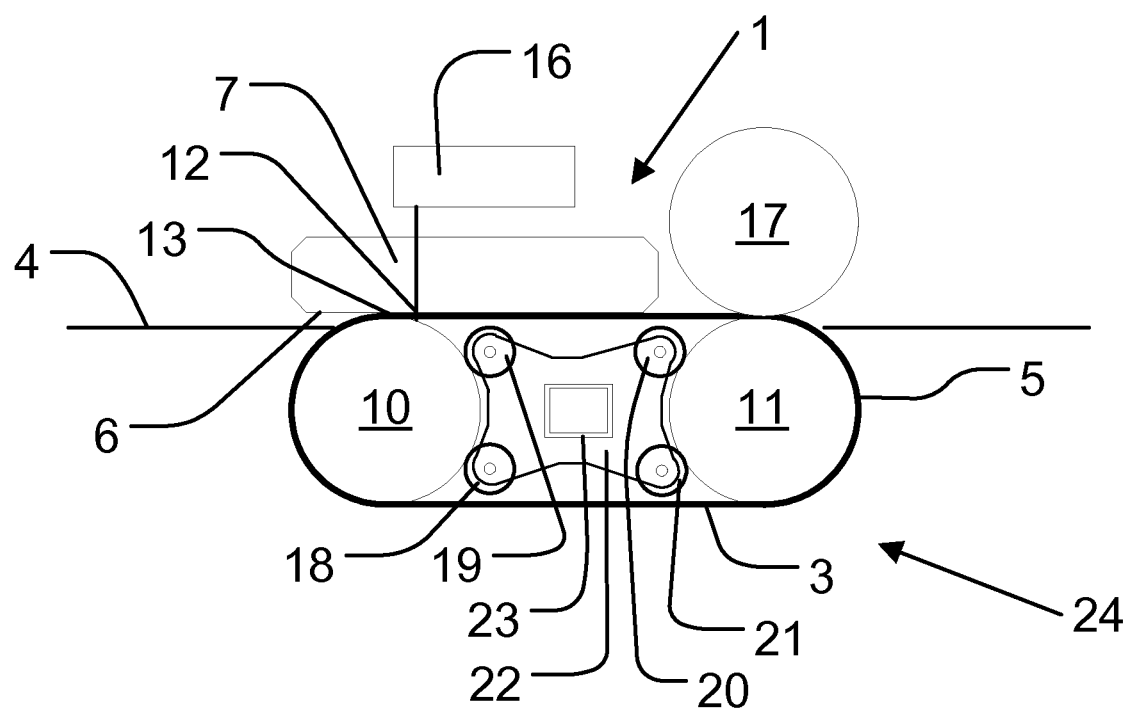
Figure 4:
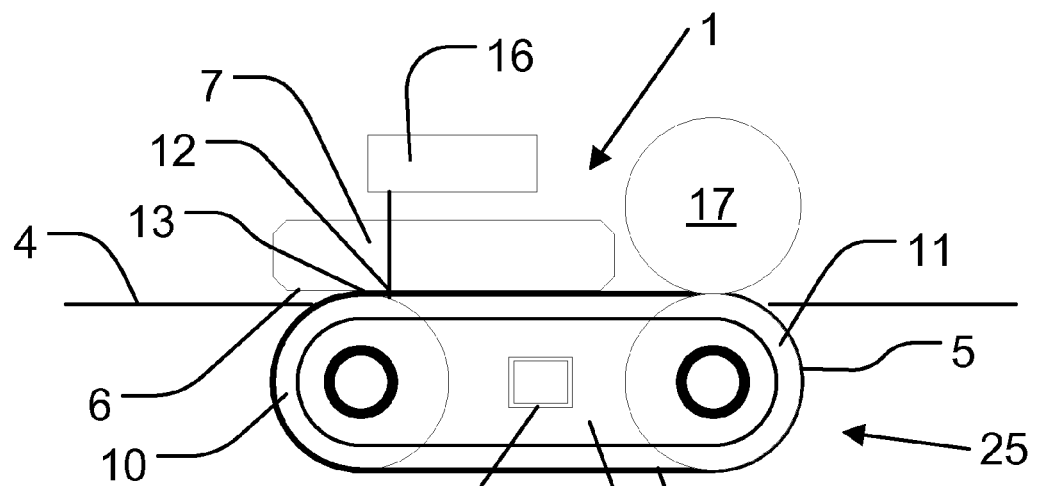
Figure 5:
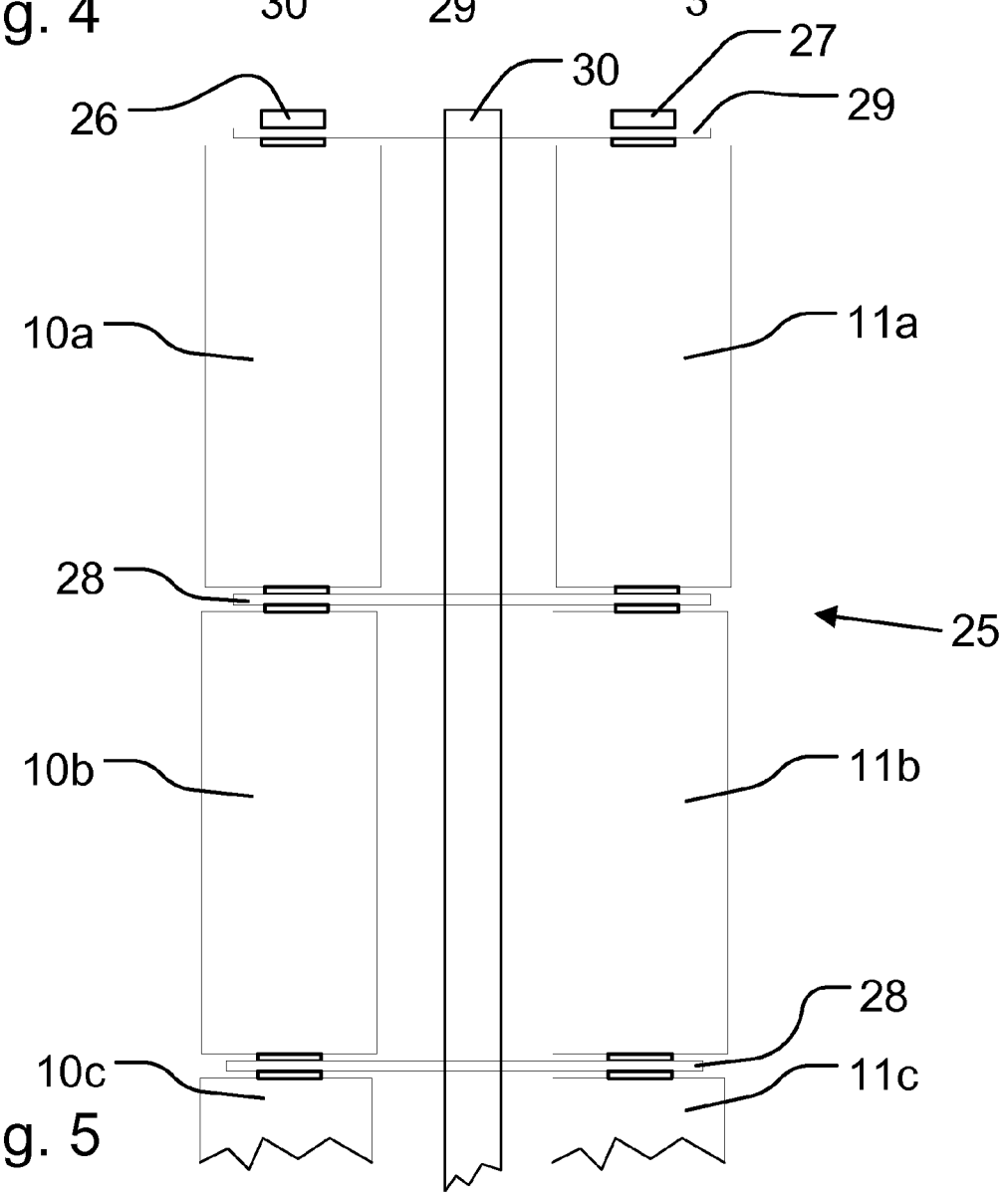

The invention will now be explained in more detail below by means of examples of embodiments with reference to the very schematic drawing, in which FIG. 1 is an end view of an embodiment of a scanner incorporating a document conveying device according to the invention;

FIGS. 2 to 4 are end views of other embodiments of a scanner incorporating a document conveying device according to the invention; and FIG. 5 is a top view of a lower part of the document conveying device in FIG. 4.

FIG. 1 shows an end view of a first embodiment of a scanner 1 incorporating a document conveying device 2 according to the invention. The document conveying device 2 comprises a conveyor belt 3 arranged to convey a document 4 between an outer surface 5 of the conveyor belt and a flat surface 6 of a glass plate 7 through which the document may be read by means of image scanning devices 14, 15 in the form of CIS (Contact Image Sensors) of the scanner 1. The scanner is of the type in which the conveying device 2 is adapted to advance the document 4 during scanning.

By employing the same conveyor belt 3 both for the conveyance of the documents 4 and for pressing the documents against the glass plate 7, some advantages are obtained. Firstly, a very compact scanner may be provided. Secondly, if the pressure applied to the document against the glass plate is increased, the friction between the conveyor belt 3 and the document 4 is also increased, and consequently, the possible conveying force is increased. This is contrary to prior art solutions, in which a separate plate or roller is biased against the document in order to press it against the glass plate, and conveying rollers are provided before and after the glass plate. Thirdly, buckling of the document is prevented during conveying, as the conveyor belt 3 contacts the document 4 continuously in the entire width of the document. Eventually, thin and thick documents may be equally well conveyed through the scanner, as the document 4 is being pressed onto the glass plate 7 by the conveyor belt 3 independently of the thickness of the document.

The conveyor belt 3 has an inner surface 9 supported by a first roller 10 and a second roller 11. A row of first image scanning devices 14 are arranged to scan the document 4 in a scanning area 12 that is displaced, in the direction towards the second roller 11, slightly away from the tangential contact point 13 of the first roller 10 in which tangential contact point the first roller contacts the flat surface 6 with the conveyor belt 3 and the document 4 in between. Similarly, a row of second image scanning devices 15 are arranged to scan the document 4 in a scanning area 12 that is displaced, in the direction towards the first roller 10, slightly away from the tangential contact point 13 of the second roller 11. The row of first image scanning devices 14 is in a manner well-known in the art arranged staggered in relation to the row of second image scanning devices 15 in order for the image scanning devices to overlap slightly and to cover the entire width of the document 4.

In order to obtain a compact document conveying device 2, the first and second rollers 10, 11 are relatively slim. Typically L/D is between about 22 to about 45, wherein L is the length of the roller, and D is the diameter of the roller. For a large format scanner, the diameter of the roller may for instance be from about 20 mm to about 30 mm. The distance between the centers of the first and second rollers 10, 11 may for instance be from about 50 mm to about 100 mm. The first and second rollers 10, 11 may for instance be made of steel or aluminium or any other suitable material. The conveyor belt 3 may be made of a material such as textile or a synthetic material such as plastic, rubber or silicone. The textile may have a brush-like surface, such as velour. For instance, the conveyor belt may be made of urethane reinforced with Kevlar (registered trademark) or glass fibres. The material may have a relatively small friction against glass and a relatively large friction against paper, so that a paper document in the scanner is being conveyed, whereas the glass plate is not affected. Preferably, the conveyor belt comprises a hard structure for ensuring that there is a continuous pressure along the surface where the document and the conveyor belt is in contact.

In order to at least partially counteract forces from the conveyor belt 3 tending to deflect the relatively slim first and second rollers 10, 11, a single support roller 8 having a larger diameter than the first and second rollers 10, 11 and having a length substantially corresponding to that of the first and second rollers is arranged in contact with the outer surface 5 of the conveyor belt 3 so that it 8 rolls against the first and second rollers with the conveyor belt 3 in between. As it may be seen in FIG. 1, the support roller 8 may have a diameter that is rather large compared to the diameter of the first and second rollers 10, 11, and thereby, the support roller 8 may have a stiffness that is substantially greater than that of the first and second rollers 10, 11. Consequently, a very good support of the first and second rollers 10, 11 may be provided along their entire length by means of the support roller 8. In this way, each of the first and second rollers 10, 11 is supported at several positions along its length. The diameter of the support roller 8 may be at least 3/2 times greater, preferably at least 2 times greater, and possibly about 3 times greater, than the diameter of the first and second rollers 10, 11.

If the tension in the conveyor belt 3 results in a deflection, that is bending, of the first and second rollers 10, 11, the conveyance of the document 4 will be irregular in the lateral direction of the conveyor belt, and consequently the image scanning devices 14, 15 will provide an irregular scanning of the document. Therefore, it is of importance that deflection of the first and second rollers 10, 11 is substantially reduced or minimized.

The ends of the first and second rollers 10, 11 may be journalled in not shown bearings that are biased in the direction of the glass plate 7, thereby providing at least a part of an adequate pressure of the conveyor belt 3 against the document 4 in order to convey the document properly. The means for biasing may be adaptable to the type of document that is conveyed, for instance a thick or a thin document, or for instance a document having a smooth surface. The adequate pressure of the conveyor belt 3 against the document 4 may alternatively or supplementary be provided by means of the pressure of the support roller 8 against the first and second rollers 10, 11. For instance, the ends of the first and second rollers 10, 11 may be journalled in bearings that are freely displaceable within a certain range, and the necessary pressure of the conveyor belt 3 against the document 4 may then entirely or substantially be provided by means of the support roller 8. Of course, supplementary support rollers may be provided in the embodiment shown in FIG. 1, for instance, a number of small support rollers could be provided within the conveyor belt 3 or rolling against the outside of the conveyor belt.

The distance between the first and second rollers 10, 11 is preferably adjustable and thereby adaptable to production tolerances of the length of the conveyor belt. The tension of the conveyor belt may also at least partly be regulated by varying the distance between the rollers. The pressure of the support roller 8 against the first and second rollers 10, 11 will, of course, also influence the tension of the conveyor belt.

FIG. 2 shows a second embodiment of the scanner 1 incorporating a document conveying device 2 according to the invention. In this embodiment, a single row of image scanning devices 16 are arranged to scan the document 4 in the scanning area 12 that, as in the embodiment shown in FIG. 1, is displaced slightly away from the tangential contact point 13 of the first roller 10. Each image scanning device 16 is a CCD camera that focuses on and covers an area of the document 4 that in the lateral direction of the document 4 slightly overlaps the area covered by the neighbor camera. As it may be seen in FIG. 2, the glass plate 7 only covers a part of the flat surface of the conveyor belt 3 at the tangential contact point 13 of the first roller 10 and in the scanning area 12. Therefore, a further support roller 17 is provided that rolls against the second roller 11 with the conveyor belt 3 and the document 4 in between. Apart from the differences mentioned, the embodiment in FIG. 2 corresponds to that of FIG. 1.

FIG. 3 shows a third embodiment of the scanner 1 incorporating a document conveying device 24 according to the invention. This embodiment corresponds to that of FIG. 2, apart from that the single support roller 8 has been replaced by a number of smaller support rollers 18, 19, 20, 21 that have a diameter that is smaller than the first and second rollers 10, 11 and that are arranged inside the loop formed by the conveyor belt 3. At several positions along the length of the first and second rollers 10, 11, a support structure 22 is arranged that carries four support rollers 18, 19, 20, 21, two 18, 19 of which roll against the first roller 10, and two 20, 21 of which roll against the second roller 11. The four support rollers 18, 19, 20, 21 are arranged symmetrically about a not shown line connecting the axes of the first and second rollers 10, 11, respectively.

The support structures 22 may have the form of plates, for instance butterfly-formed plates as shown in the figure, and they may be mounted on a profile 23 extending in parallel with the first and second rollers 10, 11 and through a central hole of each support structure 22. The support rollers 18, 19, 20, 21 may be spring-biased against the first and second rollers 10, 11 or they may be adjustably arranged on the support structures 22 in order to adjust the tension of the conveyor belt 3. In a simple embodiment, the support rollers 18, 19, 20, 21 may have the form of small ball bearings. As the support rollers 18, 19, 20, 21 are arranged and thereby supported at several positions along the length of the first and second rollers 10, 11, deflection of the first and second rollers 10, 11 may effectively be reduced or minimized although the support rollers 18, 19, 20, 21 may have a diameter that is substantially smaller than that of the first and second rollers 10, 11. The person skilled in the art will realize that the number and position of the support rollers 18, 19, 20, 21 of this embodiment may be varied in numerous ways. For instance, the support rollers 19, 20 shown as the upper rollers in FIG. 3 may be omitted, so that only the support rollers 18, 21 are employed, or even further rollers, possibly rolling on the outer surface 5 of the conveyor belt 3, may be added to those shown in FIG. 3. Similarly, the number of support structures 22 in the longitudinal length of the rollers 10, 11 may be varied. In a simple form, this embodiment according to the invention comprises one support structure 22, and the rollers 10, 11 are supported at each end by means of not shown bearings. In this way, each of the first and second rollers 10, 11 is supported at three positions along its length, namely at one position by means of four support rollers 18, 19, 20, 21 and at two positions by means of bearings. The scanning device 16 of the embodiment shown in FIG. 3 may, of course, be replaced by the scanning devices 14, 15 of the embodiment shown FIG. 1.

FIGS. 4 and 5 show a fourth embodiment of the scanner 1 incorporating a document conveying device 25 according to the invention. This embodiment is shown with the same type of scanning device 16 as shown in FIGS. 2 and 3; however, the scanning device 16 could be replaced by the two scanning devices shown in FIG. 1. In this embodiment, each of the first and second rollers 10, 11 is separated into three roller segments 10a, 10b, 10c, 11a, 11b, 11c, respectively; however, any suitable number of segments may be employed. In FIG. 5 the roller segments 10c, 11c in the bottom of the figure are shown only in part. Each roller segment 10a, 10b, 10c, 11a, 11b, 11c of the first and second rollers 10, 11, respectively, is supported on a common shaft 26, 27. By means of support structures 28 arranged between neighboring roller segments, the common shafts 26, 27 are supported between neighboring roller segments. Furthermore, the common shafts 26, 27 are supported at their ends by means of support structures 29. The support structures 28, 29 may have the form of plates in which the common shafts 26, 27 are journalled, for instance by means of ball bearings. The support structures 28, 29 may be carried by means of a supporting profile 30 extending in parallel with the first and second rollers 10, 11 and through holes of the support structures 28, 29.

In order to avoid possible problems of alignment of the axes of the bearings, the bearing may for instance be mounted in ball joints or the like, or the roller segments 10a, 10b, 10c, 11a, 11b, 11c may be mounted slightly tiltably on their common shafts 26, 27. Alternatively, each roller segment may be mounted on its own shaft.

In all the embodiments shown, the conveyor belt may be driven either by some of the rolls shown or by supplementary rolls rolling against some of the rolls shown or running against the conveyor belt. Although in the embodiments shown, the conveying device 2, 24, 25 is positioned below the scanning device 14, 15, 16, the opposite may just as well be the case.

In order to detect and survey the position of the document in the conveying device 2, 24, 25 regardless of the color and material of the document 4, a not shown sensor, such as an infrared sensor, may be arranged at the inner surface of the conveyor belt to detect an edge of a document conveyed by the conveyor belt. The edge of the document may be detected either through a number of not shown holes spaced in the longitudinal direction of the conveyor belt or through a gap provided between a first and a second conveyor belt arranged side by side. The latter embodiments are not shown.

The invention claimed is:

1. A document conveying device for use in a scanner, wherein a conveyor belt is arranged to convey a document between an outer surface of the conveyor belt and a flat surface, and wherein the conveyor belt has an inner surface supported by a first and a second roller, characterized in that each of the first and second rollers is supported at three or more positions along its length in order to at least partially counteract forces from the conveyor belt tending to deflect said roller and in that each of the first and second rollers is supported by means of one or more support rollers that are arranged so that they roll against the first or second rollers.

2. A document conveying device according to claim 1, characterized in that the at least one support roller is arranged in contact with the outer surface of the conveyor belt so that it rolls against the first and second rollers with the conveyor belt in between.

3. A document conveying device according to claim 1, characterized in that the at least one support roller has the form of one support roller having a larger diameter than the first and second rollers and having a length substantially corresponding to that of the first and the second roller.

4. A document conveying device according to claim 3, characterized in that the diameter of the support roller is at least 3/2 times greater than the diameter of the first or second roller.

5. A document conveying device according to claim 1, characterized in that the at least one support roller is biased in the direction against the conveyor belt and thereby against the first and second rollers.

6. A document conveying device according to claim 1, characterized in that the at least one support roller has the form of several support rollers that are arranged and supported separately along the length of the first and second rollers, and in that the several support rollers have a diameter that is smaller than the first and second rollers and are arranged inside the loop formed by the conveyor belt.

7. A document conveying device according to claim 6, characterized in that, at several positions along the length of the first and second rollers, a support structure is arranged that carries four support rollers, two of which roll against the first roller and two of which roll against the second roller, and in that the support rollers are arranged symmetrically about a line connecting the axes of the first and second rollers, respectively.

8. A document conveying device for use in a scanner, wherein a conveyor belt is arranged to convey a document between an outer surface of the conveyer belt and a flat surface, and wherein the conveyor belt has an inner surface supported by a first and a second roller, characterized in that each of the first and second rollers is supported at three or more positions along its length in order to at least partially counteract forces from the conveyor belt tending to deflect said roller, in that each of the first and second rollers is separated into a number of roller segments supported on a common shaft, in that, by means of support structures, the common shafts are supported at their ends, and in that, by means of one or more support structures, the common shafts are supported between neighboring roller segments.

9. A document conveying device according to claim 1, characterized in that the conveyor belt is arranged to press the document against a glass plate through which the document may be read.

10. A document conveying device according to claim 1, characterized in that the conveyor belt is provided with a number of holes spaced in the longitudinal direction of the conveyor belt, and in that a sensor is arranged at the inner surface of the conveyor belt and is adapted to detect, through the holes of the conveyor belt, an edge of a document conveyed by the conveyor belt.

11. A document conveying device according to claim 1, characterized in that the conveyor belt comprises a first and a second conveyor belt provided side by side and spaced so that a gap is provided between the first and the second conveyor belts, and in that a sensor is arranged at the inner surface of the first and second conveyor belts and is adapted to detect, through the gap between the first and second conveyor belts, an edge of a document conveyed by the conveyor belt.

12. A scanner comprising a document conveying device according to claim 1, characterized in that the conveying device is adapted to advance the document to be scanned during scanning.

13. A scanner according to claim 12, characterized in that a number of first image scanning devices are arranged at the first roller, in that a number of second image scanning devices are arranged at the second roller, in that each image scanning device has the form of a CIS (Contact Image Sensor), and in that the first image scanning devices and the second image scanning devices are arranged staggered in relation to each other.

14. A scanner according to claim 12, characterized in that a number of image scanning devices are arranged at the first roller, in that, at the second roller, the conveyor belt is arranged to convey the document between the outer surface of the conveyor belt and a third roller, in that each image scanning device has the form of a camera, such as a CCD sensor focusing by means of lenses, and in that the image scanning devices are arranged side by side with a slightly overlapping focusing area.

15. A document conveying device according to claim 4, wherein the diameter of the support roller is at least 2 times greater than the diameter of the first or second roller.

16. A document conveying device according to claim 10, wherein the sensor is an infrared sensor.

17. A document conveying device according to claim 11, wherein the sensor is an infrared sensor.

18. A scanner according to claim 12, the scanner further comprising an image scanning device arranged to scan the document in a scanning area that is displaced slightly away from the tangential contact point of the first or second roller in which tangential contact point said roller contacts the flat surface with the conveyor belt and the document in between.

19. A document conveying device according to claim 8, characterized in that the conveyor belt is arranged to press the document against a glass plate through which the document may be read.

20. A document conveying device according to claim 8, characterized in that the conveyor belt is provided with a number of holes spaced in the longitudinal direction of the conveyor belt, and in that a sensor is arranged at the inner surface of the conveyor belt and is adapted to detect, through the holes of the conveyor belt, an edge of a document conveyed by the conveyor belt.

21. A document conveying device according to claim 8, characterized in that the conveyor belt comprises a first and a second conveyor belt provided side by side and spaced so that a gap is provided between the first and the second conveyor belts, and in that a sensor is arranged at the inner surface of the first and second conveyor belts and is adapted to detect, through the gap between the first and second conveyor belts, an edge of a document conveyed by the conveyor belt.

22. A scanner comprising a document conveying device according to claim 8, characterized in that the conveying device is adapted to advance the document to be scanned during scanning.

23. A scanner according to claim 22, characterized in that a number of first image scanning devices are arranged at the first roller, in that a number of second image scanning devices are arranged at the second roller, in that each image scanning device has the form of a CIS (Contact Image Sensor), and in that the first image scanning devices and the second image scanning devices are arranged staggered in relation to each other.

24. A scanner according to claim 22, characterized in that a number of image scanning devices are arranged at the first roller, in that, at the second roller, the conveyor belt is arranged to convey the document between the outer surface of the conveyor belt and a third roller, in that each image scanning device has the form of a camera, such as a CCD sensor focusing by means of lenses, and in that the image scanning devices are arranged side by side with a slightly overlapping focusing area.

* * * * *